United States Patent Office
3,845,074
Patented Oct. 29, 1974

3,845,074
DIBENZO[b,f]THIAZEPIN[1,4]-11-YL AMINO ALKANOIC ACIDS
Charles Malen, Fresnes, Monique Desnos, Issy les Moulineaux, and Jean-Claude Poignant, Wissous, France, assignors to Societe en nom Collectif Science Union et Cie, Societe Francaise de Recherche Medicale, Suresnes, France
No Drawing. Original application June 22, 1970, Ser. No. 48,498, now Patent No. 3,723,466, dated Mar. 27, 1973. Divided and this application Nov. 30, 1972, Ser. No. 310,833
Claims priority, application Great Britain, June 20, 1969, 31,285/69
Int. Cl. A61k 27/00; C07d 93/42
U.S. Cl. 260—327 B        7 Claims

ABSTRACT OF THE DISCLOSURE

Tricyclic compounds of the formula:

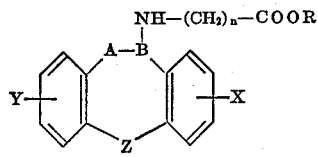

wherein $n$ is an integer from 1 to 11 inclusive; R is hydrogen or lower alkyl; X and Y are hydrogen, halogen, lower alkyl; lower alkoxy, lower alkylthio, lower alkylsulfonyl, trifluoromethyl, nitro or cyano; Z is —O—, —S—, —SO—, —SO$_2$—, >N—R″, >CH—R″, —CO—, or >CH—OH, wherein R″ is hydrogen or lower alkyl; and A—B is —N=C< or

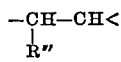

wherein R‴ is hydrogen or lower alkyl.

These compounds possess central nervous system acting properties.

---

This is a division of application Ser. No. 048,498, filed June 20, 1970, now United States Pat. No. 3,723,466, issued Mar. 27, 1973.

The present invention provides tricyclic compounds of the general formula I

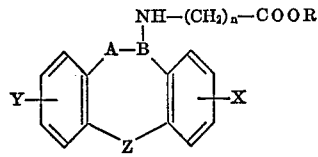

wherein $n$ is an integer of from 1 to 11 inclusive;
R is selected from the group consisting of a hydrogen atom and a lower alkyl radical containing 1 to 5 carbon atoms inclusive in a linear or branched chain;
X and Y are selected from the group consisting of a hydrogen atom, a halogen atom selected from fluorine, chlorine and bromine atoms, a lower alkyl radical containing 1 to 5 carbon atoms inclusive in a linear or branched chain, a lower alkoxy —OR′, lower alkylthio —SR′ and lower alkylsulfonyl —SO$_2$R′, wherein R′ is a lower alkyl radical containing 1 to 5 carbon atoms inclusive, a trifluoromethyl radical, a nitro radical and a cyano radical;
Z is a bivalent radical selected from the group consisting of: —O—, —S—, —SO—, —SO$_2$—, >N—R″, >CH—R″, —CO— and >CH—OH radicals wherein R″ is selected from the group consisting of a hydrogen atom and a lower alkyl radical containing 1 to 5 carbon atoms inclusive in a linear or branched chain; and
A—B is a bridge selected from the group consisting of:
—N=C< and

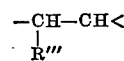

radicals wherein R‴ is selected from the group consisting of a hydrogen atom
and a lower alkyl radical containing 1 to 5 carbon atoms inclusive in a linear or branched chain.

The compounds of the general formula I wherein R represents a hydrogen atom are amphoteric compounds which yield metal salts with bases of alkaline or alkaline earth metals such, for example, as sodium, potassium or calcium hydroxide, carbonate and bicarbonate, salts with organic bases and salts with mineral or organic acids such, for example, as hydrochloric, hydrobromic, sulfuric, phosphoric, acetic, propionic, maleic, fumaric, methane sulfonic, tartaric, citric, oxalic and benzoic acids.

The compounds of the general formula (I) wherein R represents a lower alkyl radical containing 1 to 5 carbon atoms are basic compounds which yield salts with mineral or organic acids mentioned above. All these salts are included in this invention.

Furthermore, some compounds of the general formula (I) exist in the form of optical isomers and of stereoisomers, which, as such, are also included in the present invention.

The compounds of the present invention are new and are prepared by condensing a halogenated compound of the general formula

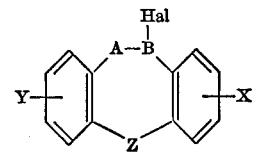

II wherein A—B, Z, X and Y have the above meanings and Hal represents a chlorine or bromine atom, with an ω-amino-ester of the general formula

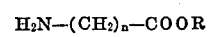 III wherein $n$ has the above meaning and R represents a lower alkyl radical containing 1 to 5 carbon atoms inclusive, to give a compound of the general formula (I) wherein R represents a lower alkyl radical, and hydrolyzing the resulting ester to form the corresponding compound of the general formula (I) wherein R represents a hydrogen atom.

The condensation of the halogenated compound (II) with the ω-aminoester (III) may be carried out in a suitable organic solvent, for example, an alcohol, nitromethane, acetonitrile, or in an aprotic solvent, for example, dimethylformamide, dimethylacetamide or hexamethyltriphosphoramide, at a temperature within the range from 20 to 100° C., in the presence of an acceptor of the hydracid formed during the reaction. This agent may be an excess of the ω-aminoester (III), a tertiary amine, a pyridine base, or a carbonate or bicarbonate of an alkali or alkaline earth metal.

The hydrolysis of the ester formed is preferably carried out either in an acid aqueous-alcoholic medium or in an alkaline aqueous-alcoholic medium. The decision whether to hydrolyze in an alkaline or acid medium depends on the stability of the heterocyclic or homocyclic central nucleus. The acid formed may be isolated either in the form of a metal salt, of a hydrochloride, or in the form of a free aminoacid.

The starting halogenated compounds (II) may be prepared by methods known per se, and most of these compounds are known.

The following examples illustrate the invention. Unless otherwise indicated, the melting points were determined on a Kofler heater. They are, in fact, decomposition points which cannot be determined precisely.

EXAMPLE 1

7-[8-trifluoromethyl-dibenzo (b,f) oxazepin (1,4)-11-yl] aminoheptanoic acid hemihydrate

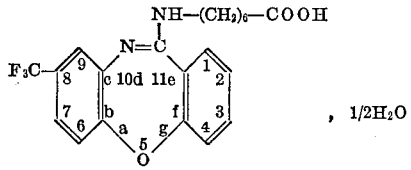

, 1/2H₂O 21 g. of methyl ortho (4-trifluoromethyl-2-amino) phenyloxybenzoate were heated under nitrogen for 7 hours at 200 to 220° C. and yielded 18.6 g. of crude 8-trifluoromethyl-dibenzo(b,f)oxazepin(1,4)-11-one, melting at 245 to 250° C.

16.4 g. of this oxazepinone were added all at once, to 130 ml. of redistilled phosphorus oxychloride. Then 5 ml. of dimethylaniline were added, the mixture was refluxed and stirred for 4 hours, then evaporated to dryness under vacuum. The residue was dissolved in ether. The ether phase was rapidly washed with water, dried then evaporated, to yield 16 g. of crude 8-trifluoromethyl-11-chloro-dibenzo(b,f)oxazepine(1,4).

16 grams of freshly distilled ethyl 7-amino-heptanoate were added all at once into a mixture of 13.7 g. of 8-trifluoromethyl-11-chloro-dibenzo (b,f) oxazepine(1,4) obtained above and 50 ml. of anhydrous nitromethane. The mixture heated up spontaneously to 35 to 40° C. The stirring was continued for one hour while allowing the mixture to cool down to room temperature and then kept for 15 hours. The solvent was then evaporated under vacuum. The residue was taken up in chloroform and water. The chloroform layer was repeatedly washed with water, dried and the solvent evaporated, to yield 17.5 g. of ethyl 7-[8-trifluoromethyldibenzo(b,f)oxazepin(1,4)-11-yl] aminoheptanoate whose content of pure product determined by titration with perchloric acid in an acetic medium, was 95%.

17 g. of the ester thus obtained were added to 40 ml. of N-sodium hydroxide solution and 80 ml. of ethanol. The mixture was refluxed for 30 minutes and the solvent then evaporated under vacuum. The residue was taken up in 100 ml. of water and the solution extracted with ether. The aqueous phase was acidified with 40 ml. of N-hydrochloric acid. The organic acid precipitated in the form of an oil and was extracted with ether. The ether phase was washed with water, dried and evaporated, to yield 11.8 g. of 7-[8-trifluoromethyl-dibenzo(b,f)oxazepin(1,4)-11-yl] aminoheptanoic acid hemihydrate which melted instantaneously at 90° C. and contained 98.5% of pure product. This acid could be recrystallized from benzene. This acid hemihydrate was stable in the air. The anhydrous product was hygroscopic and came back to the free air, in the form of the hemihydrate.

EXAMPLE 2

7-[8-nitro-dibenzo(b,f)thiazepin(1,4)-11-yl]aminoheptanoic acid hydrochloride

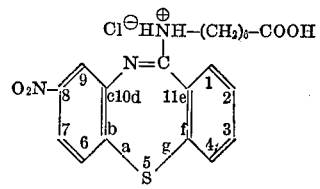

12 g. of 8-nitro - dibenzo(b,f)thiazepin(1,4) - 11 - one, melting (micro Kofler heater) at 300 to 303° C. with sublimation, were added to 80 ml. of phosphorus oxychloride and 3 ml. of dimethyl-aniline. The mixture was refluxed and stirred for 5 hours. The product dissolved slowly with release of hydrochloric gas. After reflux, the excess of phosphorus oxychloride was evaporated under vacuum. The residue was washed with water and then dried in vacuum desiccator, to yield 12.2 g. of 8-nitro-11-chloro-dibenzo(b,f)thiazepine(1,4) melting at 145 to 146° C. and after recrystallization from nitro-methane it melted at 146 to 147° C. (micro Kofler heater).

By utilizing the condensation method described in Example 1 there were obtained, from 6.7 g. of 8-nitro-11-chloro-dibenzo(b,f)thiazepine(1,4), 8.7 g. of ethyl 7-[8 - nitro - dibenzo(b,f)thiazepin(1,4) - 11 - yl] aminoheptanoate which, after recrystallization from nitromethane, melted at 97 to 98° C.

7.4 g. of the ester thus obtained were hydrolyzed with 18 ml. of N-sodium hydroxide solution and 50 ml. of ethanol. The mixture was refluxed for 15 minutes, then evaporated to dryness under vacuum and the residue taken up in water. The aqueous phase was acidified by adding an excess of hydrochloric acid. The precipitated hydrochloride was suctioned off, washed with a small quantity of ice-water and recrystallized from 90 ml. of ethanol at 20%. Yield: 5 g. of 7-[8-nitro-dibenzo(b,f)thiazepin (1,4)-11-yl]aminoheptanoic acid hydrochloride which melted instantaneously at 170° C.

EXAMPLES 3 TO 23

The compounds whose substituents and melting points are listed in the following table were prepared by the process described in Examples 1 and 2:

| No. Ex. | —A—B— | Z | n | R | X | Y | Isolated form | Melting point |
|---|---|---|---|---|---|---|---|---|
| 3 | —N=C— | O | 5 | H | H | Cl-8 | Free acid | 70° C. instantaneous. |
| 4 | Same as above | O | 5 | H | H | Cl-7 | do | 110° C. instantaneous. |
| 5 | do | O | 5 | H | Cl-2 | H | Hydrochloride | 190° C. instantaneous. |
| 6 | do | O | 5 | H | Cl-3 | H | Free acid | 110° C. instantaneous. |
| 7 | do | O | 5 | H | Cl-4 | H | do | 140° C. instantaneous. |
| 8 | do | O | 6 | H | H | Cl-8 | do | 80° C. instantaneous. |
| 9 | do | O | 6 | H | H | CH₃-8 | do | 100° C. instantaneous. |
| 10 | do | O | 6 | H | H | CH₃O—8 | Free acid hemihydrate | 100° C. (dec.). |
| 11 | do | O | 6 | H | H | CH₃—SO₂-8 | Free acid monohydrate | 110° C. instantaneous. |
| 12 | do | O | 6 | H | H | F-8 | do | 50° C. (dec.). |
| 13 | do | O | 6 | H | H | CF₃-7 | Free acid | 123° C. |
| 14 | do | O | 6 | H | H | CN-8 | Free acid hemihydrate | 100-106° C. instantaneous. |
| 15 | do | O | 6 | H | Cl-2 | Cl-8 | Free acid | 100° C. (dec.). |
| 16 | do | O | 7 | H | Cl-2 | H | do | 131-132° C. |
| 17 | do | S | 5 | H | H | H | Hydrochloride | 200° C. instantaneous. |
| 18 | do | S | 5 | H | Cl-2 | H | do | 220° C. instantaneous. |
| 19 | do | S | 6 | H | H | Cl-8 | do | 160° C. instantaneous. |
| 20 | do | SO₂ | 5 | H | Cl-2 | H | Free acid | 194° C. instantaneous. |
| 21 | do | SO₂ | 6 | H | H | Cl-8 | do | 130° C. instantaneous. |
| 22 | do | —NH— | 6 | H | H | Cl-8 | do | 150° C. (dec.). |
| 23 | do | —N(CH₃)— | 6 | H | H | Cl-8 | Sodium salt | 200° C. (dec.). |

EXAMPLE 24

6-[11-oxo-dibenzo(b,e)azepin-6-yl]aminocaproic acid hydrochloride

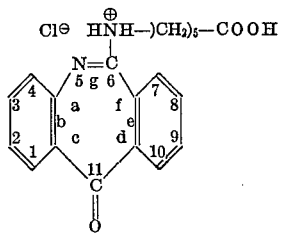

A mixture of 44.6 g. of 5,6-dihydro-6,11-morphantidine-dione, 13 ml. of dimethylaniline and 300 ml. of distilled phosphorus oxychloride was refluxed for 4 hours 30 minutes.

The batch was then evaporated to dryness under vacuum, and the residue was taken up in ice-water and rapidly extracted with chloroform. The chloroform solution was washed with hydrochloric acid, then with water. The organic phase was dried and evaporated under vacuum, to yield 26 g. of crude 6-chloro-11-oxo-dibenzo(b,e)azepine melting at 109 to 110° C.

A solution of 19.7 g. of freshly distilled ethyl 6-aminocaproate in 24 ml. of anhydrous nitromethane was added to a suspension of 14.45 g. of previously obtained crude 6-chloro-11-oxo-dibenzo(b,e)azepine in 113 ml. of anhydrous nitromethane. A slightly exothermic reaction ensued and the chlorinated derivative dissolved. The whole was kept overnight and then evaporated to dryness under vacuum. The residue was repeatedly taken up in water. Yield: 19.6 g. of a crude product melting at 99 to 110° C. which contained 99% of pure product, as determined with perchloric acid in an acetic medium. After recrystallization from 150 ml. of ethanol there were obtained 16.5 g. of ethyl 6-[11-oxo-dibenzo(b,e)azepin-6-yl]aminocaproate melting at 100 to 101° C. 8 g. of this recrystallized ester was added to 30 ml. of 2N-hydrochloric acid, and the mixture was refluxed for 30 minutes. The small quanity of insoluble matter, consisting of 6,11-morphantidinedione melting at about 260° C. was filtered off, the filtrate was quickly evapoarted to dryness and the residue was recrystallized from acetonitrile. Yield: 5.2 g. of 6-[11-oxo-dibenzo(b,e)azepin-6-yl]aminocaproic acid hydrochloride, a slightly hygroscopic product melting instantaneously at 134 to 136° C.

EXAMPLES 25 TO 28

The compounds, whose substituents and melting points are listed in the following Table, were prepared by the process described in Example 24.

EXAMPLE 29 dl 7-[8-methoxy-dibenzo(a,d)cyclo-heptadien-10-yl]aminoheptanoic acid hydrochloride 2.4 g. of sodium borohydride were added portionwise under stirring to a suspension of 15 g. of 8-methoxy-dibenzo(a,d)cycloheptadien-11-one in 100 ml. of methanol. A strongly exothermic reaction ensued and the ketone dissolved. The whole was then refluxed for one hour, then kept overnight and diluted with 200 ml. of water, extracted with chloroform, washed with water, dried and evaporated, to leave 13.6 g. of crude product which, after recrystallization from cyclohexane, gave 11.7 g. of 8-methoxy-dibenzo(a,d)cycloheptadien-10-ol melting at 85 to 86° C. (micro Kofler heater). 10.5 g. of this cycloheptadienol were dissolved in 100 ml. of chloroform and saturated with a current of dry hydrochloric gas. After an overnight contact in the absence of humidity, the solvent was evaporated under vacuum, to yield 9 g. of 8 - methoxy - 10 - chloro - dibenzo(a,d)cycloheptadiene melting at 96 to 99° C. A specimen recrystallized from cyclo-hexane melted at 98 to 102° C. (micro Kofler heater).

To 9 g. of this chlorinated derivative in 70 ml. of nitromethane were added all at once 12.5 g. of redistilled ethyl 7-aminoheptanoate in 18.5 ml. of nitromethane: the whole was heated for 1 hour at 60° C., then the nitromethane was evaporated under vacuum and the residue taken up in water then ether. The ether phase was decanted, washed with water, dried and evaporated. The residue, consisting of crude ethyl 7-[8-methoxy-dibenzo(a,d)cycloheptadien-10-yl]aminoheptanoate which contained 80% of pure product.

9.4 g. of the ester thus obtained were added to 100 ml. of aqueous hydrochloric acid; the whole was refluxed for 3 hours, then evaporated to dryness under vacuum and the residue was taken up in boiling acetonitrile. The residue was recrystallized from water, to yield 4.5 g. of dl 7-[8-methoxy - dibenzo(a,d)cycloheptadien - 10-yl]aminoheptanoic acid hydrochloride, melting at 206 to 209° C. (micro Kofler heater).

| No. Ex. | —A—B— | Z | $n$ | R | X | Y | Isolated form | Melting point |
|---|---|---|---|---|---|---|---|---|
| 25 | —N=C— | —C—‖O | 5 | $C_2H_5$ | H | H | Free base | 100 to 101° C. |
| 26 | Same as above | Same as above | 5 | $C_2H_5$ | H | Cl-2 | Hydrochloride hemihydrate | 114 to 118° C. |
| 27 | do | do | 6 | H | H | H | Free acid | 116 to 118° C. |
| 28 | do | do | 6 | $C_2H_5$ | H | Cl-2 | Hydrochloride | 120° C. instantaneous. |

EXAMPLES 30 AND 31

The compounds, whose substituents and melting points are shown in the following Table, were prepared by the process described in Example 29:

| Ex. No. | —A—B— | Z | $n$ | H | H | H | Isolated form | Melting point |
|---|---|---|---|---|---|---|---|---|
| 30 | —CH₂—CH— | $CH_2$ | 5 | H | H | H | Hydrochloride | 180–184° C. instantaneous. |
| 31 | Same as above | $CH_2$ | 6 | H | H | H | do | 210–212° C. instantaneous. |

*dl* 7-[2-chloro-10,11-dihydro-dibenzo(b,f)thiepin-10-yl] aminoheptanoic acid hydrochloride.

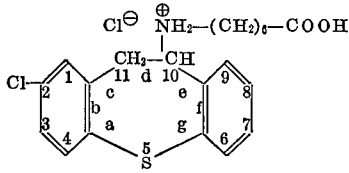

7.9 g. of 2,10-dichloro-10,11-dihydro-dibenzo(b,f)thiepine in 50 ml. of anhydrous nitromethane were added to 10 g. of freshly distilled ethyl 7-aminoheptanoate in 10 ml. of nitromethane. The whole was heated for one hour on a boiling water-bath, during which the chlorinated derivative dissolved progressively, and the batch was then kept overnight. The slight insoluble matter was filtered off and the solvent evaporated under vacuum. The residue was taken up in ether and the organic layer was repeatedly washed with water, then dried and evaporated, to yield 11.5 g. of crude ethyl 7-[21chloro-10,11-dihydro-dibenzo (b,f)thiepin-10-yl]aminoheptanoate corresponding to 80% of pure ester.

10 g. of the crude ester thus obtained were saponified with 24.5 ml. of N-sodium hydroxide solution and 50 ml. of ethanol, the mixture was refluxed for 1 hour and 30 minutes and the ethanol was then evaporated under vacuum. The residue was taken up in water. The aqueous solution was extracted with ether, the organic layer eliminated and the aqueous layer was acidified with N-hydrochloric acid to a pH-value of 1. The precipitating gummy product was extracted with chloroform and the chloroform extract was dried and evaporated under vacuum. The residue was recrystallized from acetone + alcohol to yield 5 g. of *dl* 7-[2-chloro-10,11-dihydrodibenzo(b,f)thiepin-10-yl]aminoheptanoic acid hydrochloride which melted instantaneously at 178° C.

EXAMPLES 33 to 37

The compounds, whose substituents and melting points are shown in the following Table, were prepared by the process described in Example 32:

The present invention provides also pharmaceutical compositions for oral, rectal or parenteral administration, comprising a compound of general formula I or a physiologically tolerable salt thereof, in admixture or conjunction with a pharmaceutically suitable carrier, such as, for example, distilled water, glucose, lactose, talc, starch, magnesium stearate and cocoa butter.

The doses may vary from 50 to 500 mg., 1 to 5 times a day.

What we claim is:
1. A compound selected from the group consisting of;
(A) tricyclic compounds of the general formula

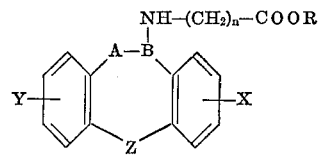

wherein
   $n$ is an integer of from 1 to 11 inclusive;
   R is selected from the group consisting of hydrogen and lower alkyl containing 1 to 5 carbon atoms inclusive;
   X and Y are selected from the group consisting of hydrogen, halogen selected from fluorine, chlorine and bromine, lower alkyl containing 1 to 5 carbon atoms inclusive, lower alkoxy-OR', lower alkylthio —SR' and lower alkylsulfonyl —SO$_2$R' wherein R' is a lower alkyl containing 1 to 5 carbon atoms inclusive, trifluoromethyl, nitro and cyano;
   Z is selected from the group consisting of: —S—, —SO—, —SO$_2$—;
   A—B is —N=C<; and
(B) physiologically tolerable addition salts with suitable bases or acids with R is hydrogen, and with suitable acids when R is lower alkyl containing 1 to 5 carbon atoms inclusive.

2. A compound of Claim 1 which is 7-[8-nitro-dibenzo (b,f)thiazepin(1,4)-11-yl]aminoheptanoic acid.

3. A compound of Claim 1 which is 6-[2-chloro-5-dioxo-dibenzo(b,f)thiazepin(1,4)11-yl]aminocaproic acid.

| Ex. No. | —A—B— | Z | n | R | X | Y | Isolated form | Melting point |
|---|---|---|---|---|---|---|---|---|
| 33 | —CH$_2$—CH— | S | 6 | H | H | H | Free acid hemihydrate | 149–152° C. (micro Kofler). |
| 34 | Same as above | S | 6 | H | Cl-8 | H | Hydrochloride | 220° C. instantaneous. |
| 35 | do | S | 6 | H | Cl-8 | Cl-2 | do | 218–220° C. instantaneous. |
| 36 | do | S | 6 | H | H | OCH$_3$-2 | do | 175–176° C. |
| 37 | do | O | 6 | H | H | Cl-2 | Free acid | 60° C. (dec.). |

The new compounds of the invention and their physiologically tolerable salts possess valuable pharmacological and therapeutic properties, especially acting on the central nervous system.

Their toxicity is weak and the LD 50 determined in the mice varies from 75 to 500 mg./kg. by the intraperitioneal route and from >300 to >2000 mg./kg. by oral route.

The various activities of the new compounds on the central nervous system has been evidenced by their interaction with the analgesic or stimulant activity of the morphine, by the potentialization of the narcosis of ethanol and by their interaction with the stimulant effects of amphetamine.

The compounds of the invention decrease the pain perception of rats submitted to electrical stimulation, the reactivity of mice and rats to external stimuli and the aggressivity of isolated mice.

The hereabove related properties, as well as the weak toxicity, enable the use of the new compounds in therapy, especially in the treatment of various central nervous system disorders and of pain.

4. The hydrochloride salt of a compound of Claim 1 wherein Z is S, X and Y are hydrogen, $n$ is 5 and R is hydrogen.

5. The hydrochloride salt of a compound of Claim 1 wherein Z is S, X is chlorine in 2-position, Y is hydrogen, $n$ is 5 and R is hydrogen.

6. The hydrochloride salt of a compound of Claim 1 wherein Z is S, X is hydrogen, Y is chlorine in 8-position, $n$ is 6 and R is hydrogen.

7. A compound of Claim 1 wherein Z is —SO$_2$—, X is hydrogen, Y is chlorine in 8-position, $n$ is 6 and R is hydrogen.

References Cited
UNITED STATES PATENTS 3,758,528   9/1973   Malen, et al. _____ 260—404

NATALIE TROUSOF, Primary Examiner

C. M. S. JAISLE, Assistant Examiner